(12) United States Patent
Borowski et al.

(10) Patent No.: US 6,260,330 B1
(45) Date of Patent: Jul. 17, 2001

(54) METHOD AND APPARATUS FOR THE FOLDING OF AN INFLATABLE AIRBAG

(75) Inventors: Joachim Borowski, Grafenay; Johannes-Alexander Varcus, Sprockhoevel, both of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/337,575

(22) Filed: Jun. 22, 1999

(30) Foreign Application Priority Data

Jun. 22, 1998 (DE) .............................. 198 27 725

(51) Int. Cl.$^7$ .............................. B65B 63/04; B60R 21/20
(52) U.S. Cl. .......................... 53/429; 53/116; 280/743.1; 493/450
(58) Field of Search ................................ 53/405, 434, 86, 53/79, 412, 429, 116, 117, 403, 432, 84, 85, 90, 510, 512; 493/405, 451, 9, 23, 450, 940; 280/743.1

(56) References Cited

U.S. PATENT DOCUMENTS

| | | | |
|---|---|---|---|
| 3,266,212 | * | 8/1966 | Monroe, Jr. ............................. 53/432 |
| 3,624,810 | * | 11/1971 | Hass ................................... 280/743.1 |
| 3,843,150 | | 10/1974 | Harada et al. . |
| 4,830,401 | | 5/1989 | Honda . |
| 5,140,799 | * | 8/1992 | Satoh ..................................... 53/429 |
| 5,180,188 | | 1/1993 | Frantz et al. . |
| 5,190,313 | * | 3/1993 | Hickling ............................ 280/743.1 |
| 5,360,387 | * | 11/1994 | Baker ..................................... 493/450 |
| 5,364,126 | | 11/1994 | Kuretake et al. . |
| 5,375,393 | * | 12/1994 | Baker et al. ............................. 53/429 |
| 5,378,011 | | 1/1995 | Rogerson et al. . |
| 5,471,817 | * | 12/1995 | Baker et al. ............................. 53/429 |
| 5,493,846 | * | 2/1996 | Baker et al. ............................. 53/429 |
| 5,547,218 | * | 8/1996 | Kuretake et al. ................. 280/743.1 |
| 5,558,365 | * | 9/1996 | Oe et al. ............................ 280/743.1 |
| 5,564,730 | | 10/1996 | Chizenko et al. . |
| 5,613,348 | * | 3/1997 | Lunt et al. .............................. 53/429 |
| 5,626,358 | | 5/1997 | Ricks et al. . |
| 5,669,204 | * | 9/1997 | Blaisdell ............................... 53/429 |
| 5,690,358 | * | 11/1997 | Marotzke .......................... 280/743.1 |
| 5,746,690 | * | 5/1998 | Humbarger et al. .................... 53/429 |
| 5,755,078 | * | 5/1998 | Hurtig, Jr. et al. ...................... 53/429 |
| 5,775,733 | * | 7/1998 | Lunt et al. .......................... 280/743.1 |
| 5,782,737 | * | 7/1998 | Warner ................................. 493/450 |
| 5,791,682 | * | 8/1998 | Hiramitsu et al. ................. 280/743.1 |
| 5,803,483 | | 9/1998 | Lunt . |
| 5,868,660 | * | 2/1999 | Yokoyama ........................... 493/940 |
| 5,960,611 | | 10/1999 | Aigner et al. . |
| 5,984,852 | | 11/1999 | Heudorfer et al. . |
| 6,070,904 | * | 6/2000 | Ozaki et al. ....................... 280/743.1 |
| 6,115,998 | * | 9/2000 | Reh et al. ............................. 53/429 |
| 6,171,228 | * | 1/2001 | Marotzke et al. ................... 493/940 |

FOREIGN PATENT DOCUMENTS

| | | |
|---|---|---|
| 19536625 | 9/1995 | (DE) . |
| 19546232 | 12/1995 | (DE) . |
| 19535565 | 1/1997 | (DE) . |
| 19648654 | 5/1998 | (DE) . |

* cited by examiner

Primary Examiner—Stephen F. Gerrity
(74) Attorney, Agent, or Firm—Kathryn A. Marra

(57) ABSTRACT

A method for the folding of an airbag for motor vehicles which comprises the steps that an airbag to be folded is fixed in a housing with its closed end at an upper part of the housing and is fastened with its open end at a base element lying opposite to the upper part in such a manner that the base element seals off the interior of the airbag against the inner space of the housing; that the housing and the base element are moved relative to one another; and that the pressure within the airbag and/or the housing is varied during the relative movement. An apparatus for the folding of an airbag, in particular for carrying out the folding method in accordance with the invention.

19 Claims, 2 Drawing Sheets

METHOD AND APPARATUS FOR THE FOLDING OF AN INFLATABLE AIRBAG

TECHNICAL FIELD

The invention relates to a method and to an apparatus for the folding of an inflatable airbag for motor vehicles.

BACKGROUND OF THE INVENTION

Methods and apparatuses of this kind serve to fold together an inflatable airbag to a size which permits the folded airbag to be mounted in a vehicle as a part of an airbag module for example as a driver's, a passenger's or a side airbag. It is known that the airbag should be folded in such a manner that it can unfold as quickly as possible in the event of a collision.

In the prior art, numerous machines have been provided for folding such air bags in fan style folds using paddles to create the folds of the airbag.

SUMMARY OF THE INVENTION

One object of the invention is to provide a method and an apparatus for the folding of an inflatable airbag by means of which an airbag can be folded rapidly and economically and nevertheless in such a manner that it can unfold readily in the event of a collision.

These advantages take place through the features of the invention which relate to the folding method, and in particular in that the method comprises the steps that an airbag to be folded is fixed in a housing with its closed end at an upper part of the housing and is fastened with its open end at a base element lying opposite to the upper part in such a manner that the base element seals off the interior of the airbag against the inner space of the housing; that the housing and the base element are moved relative to one another; and that the pressure within the airbag and/or the housing is varied during the relative movement.

The invention makes available a particularly simple folding method in which substantially only a housing and a base element which is relatively movable with respect to it are required. Moreover, the method can be carried out largely automatically. A further advantage of the invention consists in that the folding of the airbag takes place practically without contact so that the danger of damage to the airbag is small.

In accordance with a preferred embodiment of the invention the pressure is varied only within the airbag and in such a manner that the pressure is alternatingly higher and lower than an average value $P_0$, which preferably corresponds to the ambient pressure. Through this it is achieved that the not yet folded region of the airbag is alternatingly pressed outwardly in the direction of the inner wall of the housing and is drawn or sucked respectively away from the inner wall of the housing in the direction towards a centre axis of the housing. In this way the airbag is laid in folds in meander shape in the region between the centre axis of the housing and its inner wall.

In accordance with another embodiment of the invention the pressure within the airbag and the housing is varied in such a manner that it is always higher in the airbag and always lower in the housing than an average value $P'_0$, which preferably corresponds to the ambient pressure, or in such a manner that it is alternatingly higher and lower in the airbag than in the housing, but however is higher both in the housing and in the airbag than a value which preferably corresponds to the ambient pressure.

In the first alternative of this embodiment both pressures act fundamentally in the same direction in such a manner that the airbag is both pressed against the inner wall of the housing and is also sucked from the direction of the inner wall of the housing. In addition the pressures are varied in a definite way, which is dependent on the concrete design of the base element and of the housing, in such a manner that the airbag can be folded in the desired manner.

In the second alternative of this embodiment the two pressures work counter to one another, with the airbag being either pressed in the direction of the inner wall of the housing or away from the latter depending on which pressure is the higher at the moment.

In accordance with a further preferred exemplary embodiment of the invention an inhomogeneous pressure distribution is produced within the airbag and/or the housing. Through this the not yet folded region of the airbag can be brought into any desired shape at any time point during the relative movement of the housing and the base element.

The folding method in accordance with the invention thus enables a given fold structure to be intentionally produced, with the airbag preferably being laid together in the manner of a sleeping bag.

The object of the invention also takes place through the features relating to the folding apparatus, and in particular in that a housing and a base element are provided, with it being possible to fix an airbag to be folded in the housing with its closed end at an upper part of the housing lying opposite to the base element and to fasten it with its open end at the base element in such a manner that the base element seals off the interior of the airbag against the inner space of the housing, with the housing and the base element being movable relative to one another and the base element being provided with at least one control opening via which the pressure within the airbag to be folded can be varied.

Through the invention a particularly simply constructed folding apparatus is provided which enables a largely automatic and non contact folding of an airbag.

In accordance with a preferred embodiment of the invention the space bounded in a final position by the housing and the base element corresponds at least approximately to the space which is available in an airbag module housing for the folded airbag, which preferably has the final packing size. Through this the airbag which is folded with the apparatus in accordance with the invention can be integrated into an airbag module immediately after the completion of the folding process, through which the time required for the manufacture of the airbag module is shortened.

In accordance with a further preferred exemplary embodiment of the invention the edge which faces the base element of an upper part of the housing, which is formed as a cap, is formed as an abutment surface which cooperates in a final position with the base element or with an airbag module which is arranged on the base element, with it preferably being possible to fasten the airbag to be folded at the base element in the state connected to a holder element and/or a base plate of an airbag module. Thus in this embodiment an airbag module housing is simulated by the upper part of the housing, which is formed as a cap. In the final position the abutment surface of the cap comes to lie against an airbag module, in particular a holder element at a base plate, which is arranged on the base element. Thus after the removal of the airbag module having the folded airbag from the housing of the folding apparatus, only the airbag module housing need still be placed on.

If in accordance with a further preferred exemplary embodiment the cap which forms the upper part of the housing is made releasable from the housing wall, the connection between the housing wall and the cap can be released after the folding process and the complete airbag module, which is ready for installation, and of which the housing is formed by the cap, can subsequently be taken out. Then only a connection between the cap and the holder element or the base plate of the airbag module respectively need still be produced. For the next folding process then a new cap is connected as an upper part to the remaining housing wall.

In accordance with a further exemplary embodiment of the invention the housing is surrounded by a hood, with an intermediate space being formed, and is provided with at least one control opening to the intermediate space via which the pressure in the inner space of the housing can be varied. This embodiment enables the airbag to be folded to be acted on additionally from the outside in that a pressure and/or vacuum source is connected to the space formed between the housing and the hood by the intermediate space. The possibilities of producing different fold structures are hereby extended.

In accordance with a further embodiment of the invention the housing and/or the base element are/is provided with a plurality of control openings which are distributedly arranged over the housing and/or the base element for the production of a given pressure distribution and are of different sizes. Through this in particular an inhomogeneous pressure distribution within the housing and/or the airbag can be produced, which provides for a greater freedom in the fashioning of the fold structure of the airbag.

Further advantageous embodiments of the invention relating both to the folding method and to the folding apparatus are set forth in the subordinate claims, in the description and in the drawings.

BRIEF DESCRIPTION OF THE DRAWINGS

The present invention will now be described, by way of example, with reference to the accompanying drawings, in which:—

DESCRIPTION OF THE PREFERRED EMBODIMENT

Figure 1:
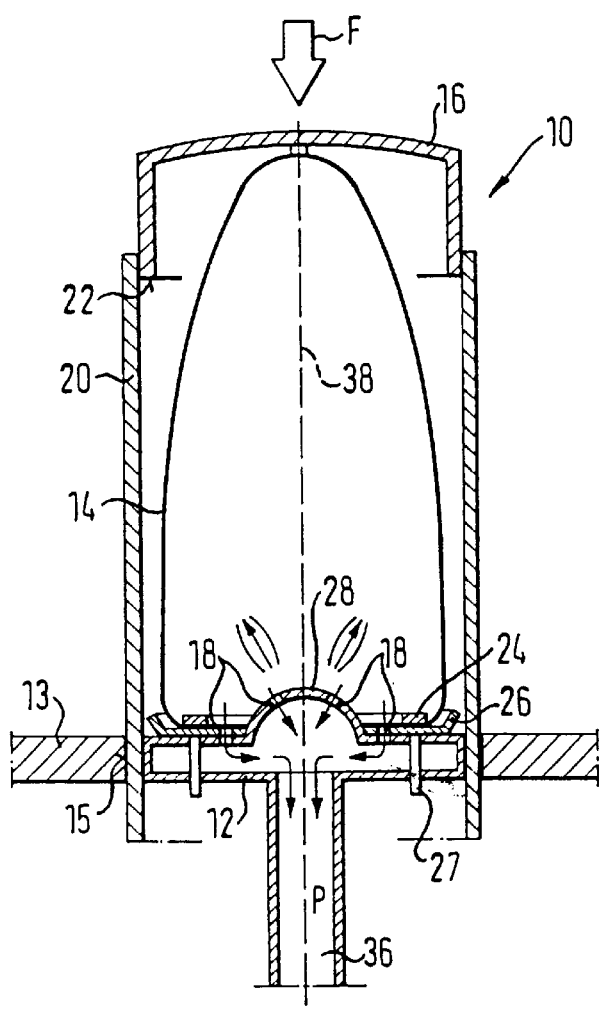
FIG. 1 is a side view of an embodiment of a folding apparatus in accordance with the invention.

In the embodiment of a folding apparatus in accordance with the invention in accordance with FIG. 1 an airbag 14 to be folded is arranged in a housing 10 and centrally fixed with its closed end at an upper part 16 of the housing 10 which is formed as a cap.

The side wall 20 of the housing 10 is passed through a gap 15 between a base element 12 and a working plate 13. The base element 12 is arranged in a plane with the working plate 13 and can be formed as a constituent of the working plate 13.

The open end of the airbag 14 is attached to a ring-shaped holder element 24 and a base plate 26 which are constituents of an airbag module which can be mounted in a vehicle.

The airbag module 24, 26 is fastened to the base element 12 via anchoring pins 27 of the base plate 26 which are passed through corresponding openings in the base element 12.

The attachment of the airbag 14 at the airbag module 24, 26 and of the airbag module 24, 26 at the base element 12 takes place in such a manner that the interior of the airbag 14 is sealed in the direction towards the housing 10.

The base element 12 is made hollow and provided in the region which faces the interior of the airbag 14 with control openings 18, of which four are illustrated in FIG. 1. Two of the illustrated control openings 18 are formed in a central, approximately hemispherically formed region 28 of the base element 12, which is formed in correspondence with a gas generator for the airbag 14 to be folded. The other control openings 18 are formed between the gas generator region 28 and the holder element 24.

The base element 12 can be connected via a central control duct 36 to a non-illustrated pressure/vacuum source, which is thus able to vary the pressure within the airbag 14 via the control openings 18.

The upper part 16 of the housing 10 is formed as a cap which has a lid section which extends parallel to the base element 12 and at which the airbag 14 is fixed, and a side wall which is perpendicular thereto and which is enveloped at the outer side by the side wall 20 of the housing 10. Consequently, a step is formed at the inner wall of the housing, with the edge of the cap-shaped upper part 16 which faces the base element 12 having an abutment surface 22 which extends parallel to the base element 12.

The free inner cross-sectional surface of the housing 10 is constant in a plane perpendicular to its centre axis 38, which is drawn in a broken line, up to the abutment surface 22 of the upper part 16, with the shape of this cross-sectional surface corresponding to the shape that the airbag 14 is to have in the folded state. For example the cross-sectional surface of the housing 10 can be circular, square, rectangular or triangular, with it being possible for corner regions to be rounded off.

Deviating from the embodiment in accordance with FIG. 1, the housing 10 can be tapered in the direction of the upper part 16, for example in the manner of a funnel. In the folded airbag the fold length then decreases with increasing distance from the base element 12.

The housing 10 is movable relative to the base element 12 and to the working plate 13. For this it can be urged by a force F which is provided by a non-illustrated drive device, which either acts at the free end of the housing 10 which protrudes through the gap 15 between the base element 12 and the working plate 13 or at the upper part 16 of the housing 10 and which is effective in the direction of the large arrow of FIG. 1.

In order to fold an airbag 14 with the apparatus illustrated in FIG. 1, the housing 10 and the base element 12 are first brought into an initial position in accordance with FIG. 1. In this initial position the distance between the place at which the airbag 14 can be attached to the upper part 16 of the housing 10 and the base element 12 corresponds to the length of the airbag 14 in the completely unfolded state.

Then the airbag 14 is fastened to the upper part 16 and to the base element 12. For this for example a non-illustrated access opening can be provided in the side wall 20 of the housing 10. Alternatively, the airbag 14 can also first be fastened at the base element 12 with the housing 10 removed and fixed at its upper part 16 when the housing 10 is placed on.

Figure 2:
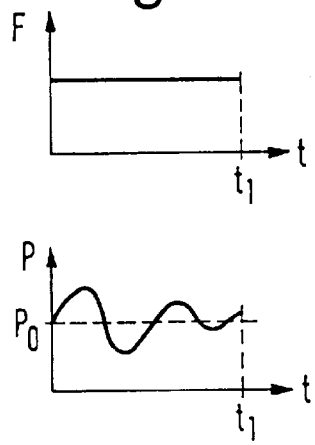
FIG. 2 is an example for the time plots of a force acting on a housing of the apparatus of FIG. 1 and of the pressure which is produced by a pressure/vacuum source which is connected to the airbag to be folded.

Then in accordance with the diagrams shown in FIG. 2 the housing 10 is moved by the temporally constant force F in the direction towards the base element 12 and at the same time the pressure within the airbag 14 is varied via the control duct 36 and the control openings 18 by means of a pressure/vacuum source which is connected to the control duct 36. The relative movement preferably takes place with constant speed.

The pressure variation takes place in such a manner that a pressure P within the hollow base element 12 develops approximately sinusoidally with decreasing amplitude and is alternatingly set higher and lower than a value $P_0$ corresponding to the ambient pressure. The pressure within the airbag 14 follows the pressure P, with the time delay depending on the number and size of the control openings 18.

The airbag jacket is alternatingly pressed in the direction of the inner wall of the housing and is drawn inwardly in the direction of the centre axis 38 of the housing 10 by the pressure variation. In FIG. 1 the apparatus is momentarily in the suction operation, which is indicated by bracketing of the small arrows which symbolise a pressure operation.

Consequently, the not yet folded region of the airbag jacket which is nearest to the base element 12 moves periodically back and forth between the inner wall of the housing and the centre axis 38 of the housing 10, with the pressure/vacuum source being set in such a manner that a switching from the pressure to the vacuum operation takes place at the moment at which the airbag jacket strikes against the inner wall of the housing 10.

Figure 3:
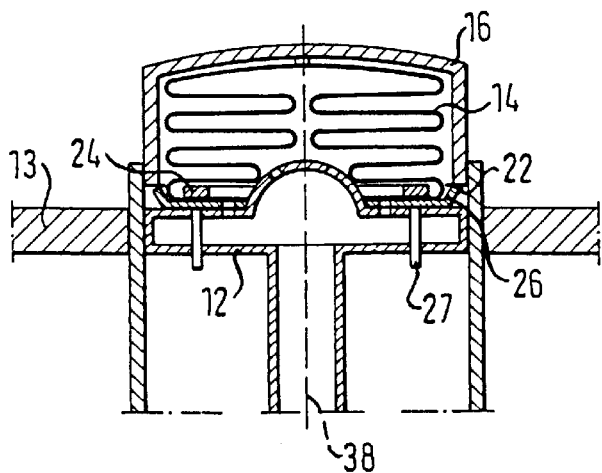
FIG. 3 is the apparatus of FIG. 1 in a final position with an example of a folded airbag.

At the end of the folding process—at the time point $t_1$ in FIG. 2—the upper part 16 of the housing lies in accordance with FIG. 3 with its abutment surface 22 in contact at an edge section of the base plate 26 which is bent away from the base element 12. The airbag 14 is folded in the way which is sketched in FIG. 3 in such a manner that a ring region is present which is arranged about the centre axis 38 of the housing and is laid in folds, with the closed end of the airbag 14 lying over the folded ring region in the manner of a lid.

The control openings 18 of the base element 12 can be arranged and dimensioned in such a manner that when the pressure P in the hollow base element 12 changes, the corresponding pressure change takes place in the airbag 14 at different places at different speeds.

In this way an inhomogeneous pressure distribution can be produced within the airbag 14 and the latter used to intentionally control the shape of the airbag 14 during the relative movement of the housing 10 and the base element 12 in such a manner that the respective desired fold structure is imparted to the airbag 14.

In the preferred embodiment the upper part 16 is releasably connected to the side wall 20 so that at the end of the folding process the connection between the upper part 16 and the side wall 20 can be released. The upper part 16 then forms the housing of the airbag module, which as a result can be taken out complete and ready for installation at the end of the folding process. For the next folding process a new upper part, i.e. the airbag module housing for the next airbag to be folded, is then connected to the remaining side wall 20. In an embodiment of this kind the upper part 16 can thus be designated as the actual housing and the side wall with a circular cross-section as a cylinder.

The embodiment of a folding apparatus in accordance with the invention in accordance with FIG. 4 corresponds to the embodiment of FIG. 1 in regard to construction, method of functioning and advantageous effects with the exception of the differences which are described in the following.

Figure 4:
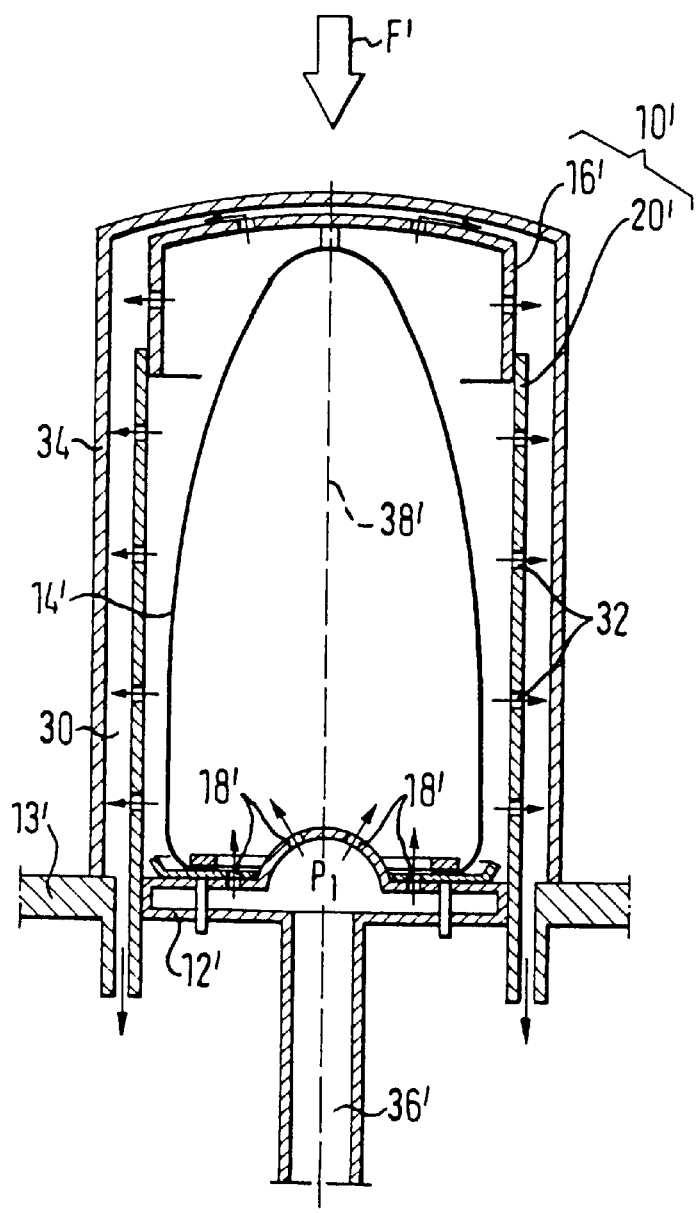
FIG. 4 is a side view of a further embodiment of a folding apparatus in accordance with the invention.

In accordance with FIG. 4 the housing 10' is surrounded by a hood 34 which stands firmly on the working plate 13', with an intermediate space 30 being formed. The housing 10' is provided with control openings 32 which are distributedly arranged over the surface of the housing 10' and which flow connect the interior of the housing 10' to the intermediate space 30.

The working plate 13' is provided with a collar which extends parallel and at a spacing to the side wall 20' of the housing and forms in this manner an extension of the intermediate space 30. This region can be formed in accordance with FIG. 4 as a ring gap which extends about the centre axis 38' of the housing 10' and via which the intermediate space 30 can be connected to a pressure/vacuum source. Alternatively, the intermediate space 30 can also end approximately at the height of the base element 12' and merely be connected to a pressure/vacuum source via a tube-like connection duct.

The width of the intermediate space 30 is not constant in the embodiment in accordance with FIG. 4 and is the greatest in the region of the side wall and the smallest in the region of a lid section of the upper part 16'.

Figure 5:
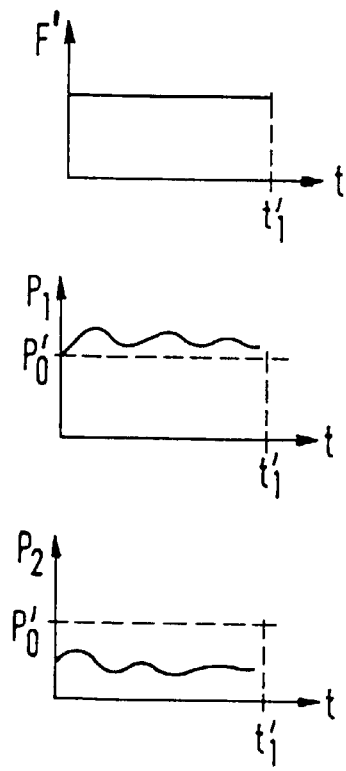
FIG. 5 is for the apparatus of FIG. 4 an example for the time plots of the parameters shown in FIG. 2 and additionally of the pressure which is produced by a pressure/vacuum source which is connected to the housing.

For the folding of the airbag 14' the housing 10' is likewise passed through the gap between the working plate 13' and the base element 12' in the folding apparatus in accordance with FIG. 4 through urging with a temporally constant force F' in accordance with FIG. 5 and preferably with a constant speed.

In deviation from the folding method described with reference to FIGS. 1 and 2, in the example in accordance with FIG. 5, the pressure $P_1$ is admittedly also periodically varied in the hollow base element 12', and indeed approximately sinusoidally and with a decreasing amplitude, but is however always above a pressure $P'_0$, which preferably corresponds to the ambient pressure. In this the pressure $P_2$ in the intermediate space 30 is likewise varied periodically, and indeed approximately sinusoidally and with a decreasing amplitude, but is however always lower than the pressure $P'_0$.

The airbag jacket is thus always pressed from within the airbag 14' against the inner wall of the housing 10' and at the same time is drawn or sucked respectively from outside the airbag 14' to the inner wall of the housing, i.e. the pressure within the airbag 14' and the pressure within the housing 10' act in the same direction.

The time variation of the pressures takes place in accordance with the invention in such a manner that the airbag jacket takes on a position within the housing 10' at each time point which permits the base element 12' and the upper part 16' to lay the airbag 14' in folds in the desired manner during their relative movement.

In this the control openings 18' of the base element 12' and the control openings 32 of the housing 10' can in each case be arranged and dimensioned in such a manner and the width of the intermediate space 30 can be dimensioned in such a manner that when the pressure $P_1$ in the hollow base element 12' or the pressure $P_2$ in the intermediate space 30 respectively changes, the corresponding pressure change in the airbag 14' and in the housing 10' takes place at different speeds at different places.

In this manner an inhomogeneous pressure distribution is produced within the airbag 14' or the housing 10' respectively which can be used to intentionally control the shape of the airbag 14' and to impart to the airbag 14' any desired fold structure.

In deviation from the above described procedure both pressures $P_1$ and $P_2$ can always be set higher than the ambient pressure and can temporally be varied in such a manner that they admittedly act opposite to one another, but that alternatingly the one or the other pressure is higher. In this way as well, the airbag jacket can for example be driven periodically back and forth between the inner wall of the housing and the centre axis of the housing in order to produce an airbag jacket which is laid in folds in meander shape.

A fold structure in which the airbag jacket is likewise laid in folds in meander shape, but the folds however extend vertically, i.e. parallel to the centre axis 38' of the housing, can be achieved with the folding apparatus in accordance with FIG. 4 if in deviation from the above described procedure the airbag jacket is sucked on both through the control openings 32 in the side wall 20' and through the control openings 18' in the base element 12' and the respective pressures are temporally varied in a suitable manner.

In principle it is not necessary to produce an ordered fold structure which is uniform about the centre axis of the housing, but rather the folding method in accordance with the invention and the folding apparatus in accordance with the invention also enable the production of a "chaotic", non predictable fold structure, which nevertheless ensures an ideal unfolding of the airbag in the event of a collision.

What is claimed is:

1. Method for folding an inflatable airbag for use in motor vehicles, comprising the steps of:
   fixing the airbag in a walled housing with a closed end of the airbag at an upper part of the housing and fastening an open end of the airbag at a base element lying opposite to the upper part in such a manner that the base element seals off the interior of the airbag against an inner space of the housing, the housing including a side wall structure extending away from the upper part and towards the base element in outboard relation to the airbag;
   moving the housing and the base element relative to one another so as to reduce the distance between the upper part of the housing and the base element; and
   alternatingly increasing and decreasing the pressure within at least one of the airbag and the housing by a multiplicity of pressure adjustment cycles comprising the sequential introduction and evacuation of a pressurizing medium during the relative movement such that the airbag is compacted in a folded orientation within the inner space bounded by the side wall structure.

2. Folding method in accordance with claim 1, further characterised in that the relative movement is carried out with at least approximately constant speed.

3. Folding method in accordance with claim 1, characterized in that the pressure is varied periodically according to a predetermined pattern of pressure adjustments, wherein the pressure adjustments are selected from the group consisting of; approximately sinusoidal variations of pressure during the relative movement, pressure variations of substantially decreasing amplitude during the relative movement, and the combination thereof.

4. Folding method in accordance with claim 1, characterized in that the pressure is varied only within the airbag and in such a manner that the pressure within the airbag is alternatingly higher and lower than the ambient pressure.

5. Folding method in accordance with claim 1, characterized in that the pressure within the airbag and the housing is varied in such a manner that it is always higher in the airbag and lower in the housing than the ambient pressure.

6. Folding method in accordance with claim 1, characterised in that the pressure within the airbag and the housing is varied in such a manner that it is alternatingly higher and lower in the airbag than in the housing, but is however always higher both in the airbag and in the housing than a value which substantially corresponds to the ambient pressure.

7. Folding method in accordance with claim 1, characterised in that an inhomogeneous pressure distribution is produced within one of the airbag or the housing.

8. Apparatus for the folding of an inflatable airbag having a closed and an open end, the apparatus comprising;
   a base element,
   a walled housing having an upper part, a side wall structure extending away from the upper part and towards the base element and an inner space bounded by the side wall structure, the housing adapted to fix an airbag to be folded in the housing with its closed end at the upper part of the housing lying opposite to the base element, the air bag having its open end fastenable at the base element in such a manner that the base element seals off an interior of the airbag against the inner space of the housing, the housing and the base element being movable relative to one another so as to reduce the distance between the upper part of the housing and the base element;
   and the base element being provided with at least one control opening via which the pressure within the airbag to be folded can be alternatingly increased and decreased by a multiplicity of pressure adjustment cycles comprising the sequential introduction and evacuation of a pressurizing medium during the relative movement of the housing and the base element such that the airbag is compacted in a folded orientation within the inner space bounded by the side wall structure.

9. Folding apparatus in accordance with claim 8, wherein the housing and the base element are movable between an initial position and a final position, with the distance between the upper part and the base element in the initial position corresponding to a length of a completely unfolded airbag.

10. Folding apparatus in accordance with claim 8, wherein the space which is bounded in a final position by the housing and the base element at least approximately corresponds to the space which is available in an airbag module housing for the folded airbag, being the final packing size.

11. Folding apparatus in accordance with claim 8, wherein the upper part of the housing is formed as a cap which is enveloped at the outer side by the side wall of the housing, the upper part being releasable from the side wall of the housing.

12. Folding apparatus in accordance with claim 8, wherein an edge that faces the base element of the upper part of the housing is formed as a cap being an abutment surface which cooperates in a final position with one of the base element or an airbag module which is arranged on the base element.

13. Folding apparatus in accordance with claim 8, wherein the airbag to be folded is fastened at the base element via one of a holder element or a base plate of an airbag module.

14. Folding apparatus in accordance with claim 8 for folding the inflatable airbag for use in an airbag module including a gas generator for generating gas to inflate the airbag, wherein a side of the base element facing the upper part of the housing includes a region that is formed corresponding to the gas generator for the airbag to be folded in which the control opening is preferably formed.

15. Folding apparatus in accordance with claim 8, wherein the housing is tapered in the manner of a funnel in the direction of the upper part, with a free inner cross-sectional surface of the housing being rectangular in each plane perpendicular to the direction of movement.

16. Folding apparatus in accordance with claim 8, wherein the housing is surrounded by a hood, with an intermediate space being formed, and is provided with at least one control opening to the intermediate space via which the pressure in the inner space of the housing can be varied.

17. Folding apparatus in accordance with claim 8, characterized in that one of the housing or the base element is provided with a plurality of control openings which are distributedly arranged for the production of a given pressure distribution over one of the housing or the base element.

18. Folding apparatus in accordance with claim 17, wherein the pressure distribution is inhomogeneous.

19. Folding apparatus in accordance with claim 17, wherein the control openings are of different sizes.

* * * * *